United States Patent
Chawla

[19]

[11] Patent Number: 5,907,023
[45] Date of Patent: May 25, 1999

[54] RADIATION-CURABLE COATING COMPOSITIONS AND OPTICAL FIBER COATINGS

[75] Inventor: Chander P. Chawla, Batavia, Ill.

[73] Assignee: DSM NV, Heerlen, Netherlands

[21] Appl. No.: 08/876,295

[22] Filed: Jun. 16, 1997

Related U.S. Application Data

[63] Continuation-in-part of application No. 08/348,187, Nov. 29, 1994, abandoned.

[51] Int. Cl.$^6$ .................................................. C08G 18/62
[52] U.S. Cl. ............................... 528/49; 522/96; 526/301; 525/455; 528/75; 428/375; 428/378; 427/163.2; 385/128
[58] Field of Search ............................... 522/96; 526/301; 525/455; 528/49, 75; 428/375, 378; 427/163.2; 385/128

[56] References Cited

U.S. PATENT DOCUMENTS

| | | | |
|---|---|---|---|
| 3,782,961 | 1/1974 | Takahashi et al. | 528/75 |
| 3,850,770 | 11/1974 | Juna et al. | 204/159.12 |
| 3,954,584 | 5/1976 | Miyata et al. | 204/159.23 |
| 4,844,604 | 7/1989 | Bishop et al. | 522/97 |
| 4,992,524 | 2/1991 | Coady et al. | 528/49 |
| 5,384,380 | 1/1995 | Kanesaki et al. | 526/313 |

FOREIGN PATENT DOCUMENTS

| | | |
|---|---|---|
| 0200366 | 11/1986 | European Pat. Off. . |
| 0423713 | 4/1991 | European Pat. Off. . |
| 0539030 | 4/1993 | European Pat. Off. . |
| 0566801 | 10/1993 | European Pat. Off. . |
| 60251152 | 12/1995 | Japan . |
| 9010659 | 9/1990 | WIPO . |
| 9204388 | 3/1992 | WIPO . |

OTHER PUBLICATIONS

Saunders & Frisch; Polyurethanes; 1962, p. 291.
Proceedings of 34$^{th}$ International Wire & Cable Symposuim, 1985, pp. 76–81.
Bishop et al, "Aspect of Thermo–Oxidative and Hydrolytic Degradation in Optical Fiber Cable Matrix Materials"; 41st International Wire & Cable Symposium; 1992; pp. 442–446.

*Primary Examiner*—Rachel Gorr
*Attorney, Agent, or Firm*—Pillsbury Madison & Sutro LLP

[57] ABSTRACT

The invention provides a radiation-curable coating composition comprising:

(A) 30–90% by weight of a urethane oligomer having three types of moieties: (I) a polyether/polyolefin block copolymeric backbone, (II) an aromatic group having one or more alkyl substituents, and (III) reactive termini, the three types of moieties being connected via urethane and/or urea linkages, the aromatic group being connected to a urethane and/or urea linkage via the one or more alkyl substituents;

(B) 5–65% by weight of one or more reactive diluents, each diluent being terminated with at least one end group capable of reacting with the reactive terminus of (A);

(C) optionally, 0–10% by weight of at least one photo-initiator;

(D) optionally, 0–5% by weight antioxidant; and (E) 0–30% by weight adhesion promoter.

The compositions have an excellent combination of properties including good optical clarity, good resistance to moisture and hexane, and high refractive index.

30 Claims, No Drawings

RADIATION-CURABLE COATING COMPOSITIONS AND OPTICAL FIBER COATINGS

This is a Continuation-in-Part of: National Appln. No. 08/348,187 filed Nov. 29, 1994, abandoned.

FIELD OF THE INVENTION

This invention relates to a radiation-curable coating composition. This invention further relates to an optical glass fiber coated with the radiation-cured coating composition.

DESCRIPTION OF RELATED ART

An optical fiber is generally coated with one or more layers of coating to protect and reinforce the optical fiber. An inner primary coating directly contacts the optical fiber, whereas an outer primary coating overcoats the inner primary coating. Radiation-curable optical fiber coatings have become the industrial standard wherein liquid radiation-curable compositions are applied to the glass fiber, and radiation-cure is effected after application of the liquid to the glass fiber. The optical fiber coating composition must satisfy many stringent requirements which depend in part on whether the coating composition is used as, for example, an inner primary coating, an outer primary coating, a single coating, or a matrix material.

The requirements of optical fiber coating compositions include being liquid at room temperature (i.e., having suitable viscosity), having a good processability and having a high cure speed.

The requirements of coatings after curing the coating composition include exhibiting very little physical change over a wide temperature range, good resistance to water sensitivity under humid conditions, low water and oil absorption, high thermal and light resistance, and low extractables. Low extractables typically means only a small portion of material in the coating can be extracted into water, organic solvents, or cable filling gels.

A further requisite of an inner primary coating composition is a refractive index high enough to refract errant signals escaping from the glass fiber away from the glass fiber. An example of such a refractive index is higher than or equal to about 1.48.

In addition, it is very important that an inner primary optical fiber coating have good optical clarity and be free from haze. Even small amounts of haze can result in a significant clarity problem. Lack of clarity can result from, for example, incompatibility among formulation components. Incompatibility can arise from mixing polar and non-polar components.

The coatings must also have adequate adhesion to optical fibers while still being strippable, such as for field splicing. The coatings should also be resistant to color changes, such as yellowing.

Many coating compositions have been formulated in order to meet these strict requirements for optical fiber coatings. However, it can be very difficult to arrive at a suitable combination of properties because formulating a composition to have one property may result in loss of other desirable properties. For example, formulation to improve non-polar solvent resistance may impact optical clarity and water-resistance. Hence, new approaches to arriving at suitable combinations of properties are needed.

European patent application 0200366 discloses a UV-curable resin composition consisting of a polyurethane derived from a polyether polyol and a hydrogenated diene (polyolefin) polymer having hydroxy groups. The polyether and polyolefin are reacted with diisocyanate. According to the examples, 2,4-toluene diisocyanate or isophorone diisocyanate is used in the preparation of the polyurethane. If 2,4-toluene diisocyanate is used to prepare the polyurethane, this can result in instability of the coating shown as yellowing. If isophorone diisocyanate is used as a diisocyanate, as in example 5 of EP '366, it was found that yellowing can be avoided. The difficulty is that the refractive index of a primary coating prepared from such a composition is too low to refract errant signals escaping from a glass fiber away from the glass fiber.

European patent application 0566801 describes a radiation curable coating composition for an optical fiber consisting of (A) 10% to 90% by weight of a reactively terminated urethane oligomer which is the reaction product of a polyether polyol, an aliphatic polyisocyanate and an endcapping monomer, (B) 5–80% of one or more diluents, (C) 0.1 to 3.0% of an organo-functional silane adhesion promoter, and optionally (D) 0.1–10.0% of a photoinitiator. To adjust the refractive index of the inner primary coatings polyalkylene glycol nonylphenylether acrylate is added to the coating compositions in examples I to X. It was found that the addition of polyalkylene glycol nonylphenylether acrylate has a deleterious effect on the resistance to water sensitivity and oil of the coating compositions.

European patent application 0539030 describes a coating material for an optical fiber consisting of an ethylenically terminated urethane oligomer derived from a polyester polyol containing dimer acid residues. At page 4, lines 15–18, it is disclosed that tetramethylxylylene diisocyanate (TMXDI) can be used as the organic isocyanate used to make the urethane acrylates. No advantages of using TMXDI over the other isocyanates mentioned are provided. Moreover, this disclosure is directed to a urethane based on a specific polyester polyol.

These compositions do not provide the suitable combination of properties which have been found in the present invention.

SUMMARY OF THE INVENTION

It is an object of the invention to provide a coating composition that can be cured to form a coating having sufficient color stability, optical clarity, improved resistance to solvents, and other desirable combinations of properties. This coating composition can be used to form inner primary coatings having a refractive index sufficiently high to refract errant signals escaping from a glass fiber away from the glass fiber. Surprisingly, it has been discovered that a combination of desirable properties can be achieved in formulations according to the invention, whereas formulations having similar components do not provide the desirable combination of properties.

An embodiment relates to a coating composition comprising:

(A) about 30 to about 90% by weight of urethane oligomer having reactive termini;

(B) about 5 to about 65% by weight of one or more reactive diluents, each diluent being terminated with at least one end group capable of reacting with the reactive terminus of (A);

(C) optionally, 0 to about 10% by weight of at least one photoinitiator;

(D) optionally, 0 to about 5.0% by weight antioxidant; and (E) optionally, 0 to about 30% by weight adhesion promoter.

In this embodiment, the urethane oligomer comprises at least three types of moieties, (I) a polyether block and an aliphatic polyolefin block, wherein the polyolefin block has a molecular weight of less than about 1,800 g/mol, (II) an aromatic group having one or more alkyl substituents, and (III) reactive termini. The three types of moieties are connected via urethane and/or urea linkages. The aromatic groups are connected to urethane and/or urea linkages via the one or more alkyl substituents.

In another embodiment of the coating composition, the urethane oligomer is obtained by the reaction of (i) at least one oligomer based on a polyether, and at least one oligomer based on an aliphatic polyolefin, wherein the molecular weight of the polyolefin oligomer is less than about 1,800 g/mol, each oligomer having at least two groups selected from the group of hydroxyl groups and amine groups, (ii) an aromatic polyisocyanate, wherein the isocyanate groups are not directly linked to the aromatic group, and (iii) a hydroxy functional ethylenically unsaturated monomer.

In a further embodiment of the coating composition described above, the urethane oligomer having reactive termini can be represented by the general formula (1):

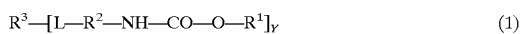

wherein:

$R^1$ is a reactive terminus, $R^2$ is an aromatic group having one or more alkyl substituents, wherein the urethane (O—CO—NH—) group and L are attached to the one or more alkyl substituents, $R^3$ is a block copolymeric oligomer comprising a polyether block and an aliphatic polyolefin block, wherein the molecular weight of the polyolefin block is less than about 1,800 g/mol, L is a urethane linkage, a urea linkage, or mixtures thereof, and Y is 2 or greater.

A further embodiment relates to a glass fiber having at least one coating, and preferably an inner primary coating, formed by curing at least one of the coating compositions defined herein.

The coating compositions provide a cured coating having a high refractive index and good resistance to color change, and an improved resistance to solvents.

DETAILED DESCRIPTION OF PREFERRED EMBODIMENTS

An embodiment relates to a coating composition comprising:

(A) about 30 to about 90% by weight of a urethane oligomer having reactive termini;

(B) about 5 to about 65% by weight of one or more reactive diluents, each diluent being terminated with at least one end group capable of reacting with the reactive terminus of (A);

optionally (C) 0 to about 10% by weight of photoinitiator;

optionally (D) 0 to about 5.0% by weight of an antioxidant; and optionally (E) 0 to about 30% by weight of an adhesion promoter.

The urethane oligomer comprises at least three types of moieties: (I) an oligomeric polyether block and polyolefin block, (II) an aromatic group having one or more alkyl substituents, and (III) reactive termini. The at least three types of moieties are connected via urethane and/or urea linkages. The aromatic groups are connected to urethane and/or urea linkages via the one or more alkyl substituents. Preferably, the three types of moieties are connected via urethane linkages and the aromatic groups are connected to urethane linkages via the one or more alkyl substituents.

In another embodiment of the coating composition, the urethane oligomer is obtained by the reaction of (i) at least one oligomer based on a polyether, and at least one oligomer based on an aliphatic polyolefin, each oligomer having at least two groups selected from the group of hydroxyl groups and amine groups, (ii) an aromatic polyisocyanate, wherein the isocyanate groups are not directly linked to the aromatic groups, and (iii) a hydroxy functional ethylenically unsaturated monomer.

The oligomer (i) based on a polyether block and a polyolefin block, or a copolymer thereof, for example, can have at least one hydroxyl group and at least one amine group, or at least two amine groups, or at least two hydroxyl groups. More than one type of oligomer (i) can be present. Furthermore, during the reaction, the oligomer (i) can be linked via urethane and/or urea linkages to another oligomer (i) to thereby form a larger backbone. Preferably, the oligomer (i) has at least two hydroxyl groups and substantially no amine groups which can react with the aromatic isocyanate.

In a further embodiment of the coating composition, the urethane oligomer with reactive termini can be represented by the general formula (1):

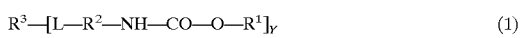

wherein:

$R^1$ is a reactive terminus, $R^2$ is an aromatic group having one or more alkyl substituents, wherein the urethane (O—CO—NH—) group and L are attached to the one or more alkyl substituents, $R^3$ is an oligomer based on a polyether, a polyolefin, a copolymer of a polyether and a polyolefin, or mixtures thereof, L is a urethane linkage, a urea linkage, or mixtures thereof, and Y is 2 or greater, preferably 2 to 5, more preferably 2 to 3, and most preferably 2.

In formula (1), the oligomer $R^3$ is polyfunctional such that each of the groups —L—$R^2$—NH—CO—O—$R^1$ is directly linked to the oligomer $R^3$. For example, if Y is 3, then there are three groups —L—$R^2$—NH—CO—O—$R^1$ directly linked to the oligomer $R^3$. The coating composition can contain mixtures of urethane oligomers of different functionality, for example, mixtures of urethane oligomers having different Y values.

In formula (1), L is preferably a urethane linkage.

The coating composition can optionally contain a small quantity of monofunctional oligomer $R^3$, where Y is equal to 1. In such a case, the average functionality of the oligomer $R^3$ is preferably greater than about 1.8.

A further embodiment relates to a glass fiber having at least one coating formed by curing at least one of the coating compositions defined herein.

The coating compositions can be cured to form coatings having a refractive index sufficiently high to refract errant signals escaping from a glass fiber away from the glass fiber, for example, of at least approximately 1.48, even if only non-aromatic reactive diluents are used as component (B). Furthermore, the cured coatings have good color stability.

The coatings formed from the coating compositions have an excellent resistance to organic solvents. For example, the hexane absorption is less than about 40 wt. %, and the hexane extraction is less than about 8 wt. %, are preferably less than about 7 wt. %, using the test methods described herein.

The coatings formed from the coating compositions have an excellent resistance to inorganic solvents. For example, the water absorption is less than about 1 wt. %, and the water extraction is less than about 1 wt. %, using the test methods described herein.

Besides the above described characteristics, the coatings have the required characteristics for inner-primary optical fiber coatings with regard to toughness, and low modulus at low temperature. Furthermore, the coatings have good adhesion to the optical fiber and yet are strippable, such as for field splicing.

The reactive terminus ($R^1$) of the urethane oligomer can be, for example, provided by acrylate, methacrylate, vinylether, maleate or fumarate functionality. This functional group can be, for example, attached to the urethane groups via a low molecular weight polyol. As a reactive terminus, acrylate or vinylether functionality is preferred. Examples of low molecular weight polyols that can be used are butane-diol, hexane- diol, and the like. Other low molecular weight polyols that can be used include ethylene glycol, 1,2-propylene glycol, and their oligomers up to about 12 units.

Monomers having an (meth)acrylate functional group include, for example, hydroxy functional acrylates such as 2-hydroxyethyl acrylate, 2-hydroxypropyl acrylate, and the like. Monomers having a vinyl ether functional group include, for example, 4-hydroxybutyl vinyl ether, and triethylene glycol monovinyl ether. Monomers having a maleate functional group include, for example, the methylester of hydroxy ethyl maleate. For example, β-hydroxyethyl acrylate can be reacted with the polyisocyanate to provide the terminal reactive group.

The aromatic polyisocyanate used to make the urethane oligomer has two or more isocyanate functional groups attached to its core ($R^2$). The core ($R^2$) comprises at least one aromatic group and at least one alkyl group, wherein the isocyanate groups are not directly linked to an aromatic group.

Preferably, the core ($R^2$) comprises one or two aromatic groups and one to six alkyl groups, such as. Examples include xylene derivatives. Preferably, the alkyl groups have one to eight carbon atoms.

Preferably, the isocyanate has the general formula (2):

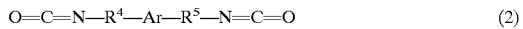

$$O=C=N-R^4-Ar-R^5-N=C=O \qquad (2)$$

where $R^4$ and $R^5$ are saturated hydrocarbon groups and can be in any of the ortho, meta or para positions with respect to each other, or mixtures thereof, and Ar is an aromatic group. Preferably, the saturated hydrocarbon groups are in the meta position with respect to each other.

Preferably $R^4$ and $R^5$, which can be the same or different, comprise 1–6 carbon atoms. More preferably, $R^4$ and $R^5$ are both propylene. The aromatic group in formula 2 can be substituted with alkyl or aryl groups.

It is within the realm of the invention to use a substantial amount of polyisocyanate with a core $R^2$ in combination with aliphatic isocyanate as long as the amount of isocyanate having aromatic groups is sufficient to result in a coating having a refractive index sufficiently high to refract errant signals escaping from a glass fiber away from the glass fiber.

The oligomer having at least two groups selected from the group of hydroxyl groups and amine groups (hereinafter "the oligomer polyol/polyamine"), used to make the oligomer part $R^3$ of the urethane oligomer, can have more than one hydroxyl group and/or amine group that can react with polyisocyanate. Preferably, the oligomer polyol/polyamine has less than 3 (on average) hydroxyl groups and/or amine groups that can react with the polyisocyanate. The oligomer part ($R^3$) comprises one or more polyether oligomers, one or more polyolefin oligomers, a copolymer thereof, or mixtures thereof.

If more than one polyether or polyolefin, or a mixture of a polyether and a polyolefin, are used to form the oligomer part $R^3$, they can be linked, for example, via urethane and/or urea linkages. In such a case, the oligomer part $R^3$ can be formed before combining with $R^5$, $R^2$, and polyisocyanate, or can be formed in situ when the urethane oligomer is formed. The latter in situ method is preferred.

The oligomer polyol/polyamine preferably has a molecular weight of more than about 200, more preferably higher than 250, more preferably higher than 400, and most preferably higher than 500. Molecular weight, as used throughout this application, is the calculated molecular weight of the molecule concerned. In case of a polymer structure, it is the calculated molecular weight of the expected structure, based on the starting materials and reaction conditions. The molecular weight can also be determined using conventional techniques such as Gel Permeation Chromatography using polystyrene calibration standards. The equivalent weight of the urethane oligomer (based on acrylate) is preferably less than about 5,000, and more preferably less than about 2,500 g/mol.

The backbone of the urethane oligomer can comprise one or more polymer blocks coupled with each other via urethane and/or urea linkages. The use of a polyether as the backbone has the advantage that it results in coatings having a low glass transition temperature and good mechanical properties such as tensile strength and modulus, and good resistance to oil. If the backbone is a polyolefin, the resulting coatings have further improved resistance against water absorption. Suitable combinations of polyether and polyolefin can result in desirable combinations of properties if those combinations can be made compatible.

The polyether can be, for example, a substantially non-crystalline polyether. Preferably, the polyether comprising repeating units of one or more of the following monomer groups:

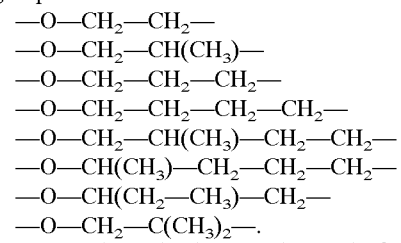

—O—$CH_2$—$CH_2$—
—O—$CH_2$—$CH(CH_3)$—
—O—$CH_2$—$CH_2$—$CH_2$—
—O—$CH_2$—$CH_2$—$CH_2$—$CH_2$—
—O—$CH_2$—$CH(CH_3)$—$CH_2$—$CH_2$—
—O—$CH(CH_3)$—$CH_2$—$CH_2$—$CH_2$—
—O—$CH(CH_2$—$CH_3)$—$CH_2$—
—O—$CH_2$—$C(CH_3)_2$—.

Hence, the polyether can be made from, for example, ethylene oxide, propylene oxide, tetrahydrofuran, methyl-substituted tetrahydrofuran, 1,2-epoxybutane, and the like.

A polyether that can be used is a polyether containing both branched and non-branched oxyalkylene repeating units, which is the polymerization product of 20 percent by weight of 3-methyltetrahydrofuran and 80 percent by weight of tetrahydrofuran, both of which have undergone a ring opening polymerization. This polyether copolymer is marketed as PTG-L 1000 (Hodogaya Chemical Co., Japan). Another example of a polyether that can be used is PTG-L 2000 (Hodogaya).

Examples of the oligomer polyol/polyamine include, for example, the following polyether polyols: Arcol PPG-1025, Pluracol P-2010 (BASF), Poly THF-1000 and Poly THF-2000 (BASF), BO and PO polyols from Dow Chemical, and Terathane 2000 from DuPont.

Examples of the oligomer polyamines include, for example, polyoxyalkyleneamines, such as, polyethyleneglycol diamine and polypropyleneglycol diamine, which are commercially available under the trade name Jeffamine (Texaco).

The polyolefin used as the backbone of the oligomer polyol can be, for example, a linear or branched hydrocarbon containing a plurality of hydroxyl end groups. "Hydrocarbon" is used herein to represent a non-aromatic compound containing a majority of methylene groups ($-CH_2-$) and which can contain internal unsaturation and/or pendent unsaturation. Fully saturated, for example, hydrogenated, hydrocarbons are preferred because the long term stability of the cured optical fiber coating increases as the degree of unsaturation decreases. Aliphatic polyolefins are preferred.

Examples of hydrocarbon polyols include hydroxyl-terminated fully or partially hydrogenated 1,2-polybutadiene; 1,4- 1,2-polybutadiene copolymers, 1,2-polybutadiene-ethylene or -propylene copolymers, polyisobutylene polyol, mixtures thereof, and the like. Preferably, the hydrocarbon polyol is a substantially fully hydrogenated 1,2-polybutadiene or 1,2-polybutadiene-ethylene copolymer.

In another preferred embodiment, the hydrocarbon polyol is a dimer acid type of polyol such as, for example, Empol 1070 (Henkel).

The oligomer polyol/polyamine preferably comprises at least one polyolefin oligomer.

Block copolymers of polyethers and polyolefins are preferably incorporated into the oligomer structure. However, block copolymers can generate incompatibility and cause loss of optical clarity if suitable blocks are not used. For example, a relatively non-polar polyolefin block can be incompatible with a relatively more polar polyether block. Compatibility can be improved by adjusting the amounts and molecular weights of the less polar polyolefin block and the more polar polyether block.

When oligomers are used which comprise polyether block and polyolefin block, the molecular weight of the polyolefin block is kept to below about 1,800 g/mol, and preferably, to below about 1,500 g/mol, and more preferably, to below about 1,000 g/mol to avoid problems with optical clarity.

Overall oligomer molecular weight is preferably less than about 5,000 g/mol.

Preferably, mixtures of oligomer polyol/polyamines can be used as well. More preferably, mixtures of polyether polyol/polyamines and polyolefin polyol/polyamines are used.

Known processes of producing urethane oligomers in general can be used to produce the urethane oligomer. However, the process of making the urethane oligomer preferably proceeds as follows. In the reaction between a hydroxy functional ethylenically unsaturated monomer, which can be the reactive terminus $R^1$, and polyisocyanate, preferably a stoichiometric balance between hydroxy functionality and the polyisocyanate is used and the reactants are maintained at a reaction temperature of below about 40° C. The hydroxy functionality will then be substantially consumed.

The mole ratio of the isocyanate groups to the hydroxy groups of the ethylenically unsaturated monomer is preferably in the range of about 2:1 to about 1.2:1, and more preferably about 1.5:1. The hydroxy functional ethylenically unsaturated monomer attaches to the isocyanate via an urethane linkage.

If the oligomer polyol/polyamine is prepolymerized, or comprises one polyolefin or polyether, the reaction product of the isocyanate and the ethylenically unsaturated monomer is further reacted with the oligomer polyol/polyamine, preferably in a molar ratio between about 1.8:1 to about 2.0:1 if the oligomer polyol/polyamine has only two groups selected from hydroxyl groups and amine groups. If the oligomer polyol/polyamine has a higher or lower (average) hydroxyl/amine functionality, the molar ratio is preferably proportionally higher or lower. Thereby, a product is obtained which is end-capped with the reaction product from the isocyanate/ethylenically unsaturated monomer reaction. "End-capped" is used herein to represent that a functional group caps the ends of the oligomer polyol/polyamine.

If the oligomer polyol/polyamine is formed in situ, for example, by linking polyether and/or polyolefin blocks using urethane and/or urea linkages, the mole ratio of isocyanate should be increased by one mole of isocyanate reactive groups for each mole of urethane and/or urea linkages required to link the polymer blocks. For example, if 1 mole of polyether diol, 1 mole of a polyolefin diol and 2 moles of hydroxy functional ethylenically unsaturated monomer are to be reacted, about 3 moles of diisocyanate would be required. 1 mole of diisocyanate would be consumed to form urethane linkages between the polyether diol and the polyolefin diol thereby forming an oligomer polyol, and the other 2 moles of diisocyanate would be consumed by linking the hydroxy functional ethylenically unsaturated monomers to the oligomer polyol.

A significant amount of aliphatic polyisocyanate can be used as long as the amount of aromatic polyisocyanate is sufficient to result in a coating having a refractive index sufficiently high to refract errant signals escaping from a glass fiber away from the glass fiber. The coating composition preferably comprises at least about 1 weight %, preferably at least about 6 weight % aromatic groups originating from the polyisocyanate.

For example, if 3 moles of polyether blocks, 2 moles of hydroxy functional ethylenically unsaturated monomer are to be reacted, 4 moles of diisocyanate would be required. In this instance, 2 moles of a diisocyanate compound which comprises aromatic groups, such as TMXDI, and 2 moles of aliphatic diisocyanate can be used. The aromatic diisocyanate can be specifically used to connect the polyether blocks, or to connect the hydroxy ethylacrylate to the oligomer, or the two diisocyanates can be used at random.

The urethane and urea reactions can take place in the presence of a catalyst. Examples of catalysts that can be used include dibutyltin dilaurate, diazabicyclooctane crystals, and the like.

The amount of oligomer (A) can be about 30 wt. % to about 90 wt. %, and preferably, about 40 wt. % to about 90 wt. %, and more preferably, about 50 wt. % to about 90 wt. %. In one embodiment, the amount is about 30 wt. % to about 80 wt. %.

The coating composition comprises one or more reactive diluents (B). Preferably, the coating composition comprises a mixture of (B-1) a reactive diluent which is terminated with one end group capable of reacting with the reactive terminus of the oligomer, and (B-2) a multifunctional diluent which is terminated with at least two end groups capable of reacting with the reactive terminus of the oligomer.

If reactive diluent (B-1) is present, preferably it is present in an amount of more than about 5 wt. % and less than about 60 wt. %, more preferably less than 45 wt. %. Reactive diluent (B-1) can be a mixture of diluents as explained below.

If reactive diluent (B-2) is present, preferably it is present in an amount of more than about 5 wt. % and less than about 35 wt. %, more preferably less than 25 wt. %. Reactive diluent (B-2) can be a mixture of multifunctional diluents. Reactive diluent B-2 is less preferred for inner primary coatings.

The reactive diluents can be used in the coating compositions to lower the viscosity and/or to provide required properties, such as hardness.

Reactive diluents preferably have a molecular weight of less than about 550 or a viscosity at room temperature of less than about 300 mPas.s (measured as 100% diluent).

The reactive diluent B-1 preferably comprises a monomer having an acrylate or vinyl ether functionality and an $C_4$–$C_{20}$ alkyl or polyether moiety. Examples of such monomer diluents are hexylacrylate, 2-ethylhexylacrylate, isobornylacrylate, isodecylacrylate, laurylacrylate, stearylacrylate, ethoxyethoxyethylacrylate, laurylvinylether, 2-ethylhexylvinyl ether, and the like. This type of reactive diluent preferably is present in an amount between about 1 and about 35 wt. %.

The reactive diluent B-1 can also be a compound comprising an aromatic group. Conventional coating compositions use an aromatic moiety to adjust the refractive index of the coating composition to a value above 1.48, which is important if the coating is used as an inner primary optical fiber coating. In the coating compositions according to the present invention, aromatic moieties are not necessary because the refractive index is already high enough to refract errant signals escaping from a glass fiber away from the glass fiber. Nevertheless, the use of this type of compound might be useful to enhance the compatibility of the several coating constituents. Examples of a diluent having an aromatic group that can be used include: ethyleneglycolphenyletheracrylate, polyethyleneglycolphenyletheracrylate, polypropyleneglycolphenyletheracrylate, and alkyl-substituted phenyl derivatives of the above exemplary monomers, such as polyethyleneglycolnonyl-phenyletheracrylate. This type of reactive diluent preferably is present in an amount between about 1 and about 35 wt. %, and more preferably in an amount of less than 10 wt. %.

Reactive diluent B-2 preferably is a diluent having two groups capable of polymerization using actinic radiation. A diluent having three or more of such reactive groups can be present as well. Examples of such diluents are $C_2$–$C_{18}$ hydrocarbondiol-diacrylates, $C_4$–$C_{18}$ hydrocarbondivinylethers, $C_3$–$C_{18}$ hydrocarbon triacrylates, and the polyether analogues thereof: such as 1,6-hexanedioldiacrylate, trimethylolpropanetriacrylate, hexanedioldivinylether, triethyleneglycoldiacrylate, pentaerythritoltriacrylate, ethoxylated bisphenol-A diacrylate, and tripropyleneglycol diacrylate.

For a given composition and oligomer system, the amount of the diluent system can be adjusted to bring the viscosity within a suitable range for optical fiber application. For example, more diluent may be required for higher molecular weight oligomers than for lower molecular weight oligomers.

The coating compositions can further comprise: (C) 0.1–10% by weight of one or more photoinitiators.

The photoinitiator can be useful when ultraviolet radiation is used to cure the coating composition. A photoinitiator is typically not useful in other embodiments, for example, when electron beam cure of a free radical system is used. In cationically cured systems, however, a photoinitiator can be useful even when an electron beam cure is used.

The photoinitiator, when used in a small but effective amount to promote radiation cure, must provide reasonable cure speed without causing premature gelation of the composition. The cure speed desired will depend on the application of the coating and a skilled artisan will easily be able to adjust the amount and type of photoinitiator to obtain the desired cure speed. The type of photoinitiator which is used will be dependent on whether a free radical-type system or a cationic cure type-system is used, and a person of ordinary skill in the art will easily understand what type of photinitiator to use.

Free radical-type photoinitiators include, for example: hydroxycyclohexylphenyl ketone; hydroxymethylphenyl-propanone; dimethoxyphenylacetophenone; 2-methyl-1-[4-(methylthio)-phenyl]-2-morpholino-propanone-1; 1-(4-isopropylphenyl)-2-hydroxy-2-methylpropan-1-one; 1-(4-dodecyl-phenyl)-2-hydroxy-2-methylpropan-1-one; 4-(2-hydroxyethoxy)phenyl-2(2-hydroxy-2-propyl)-ketone; diethoxyphenyl acetophenone; 2,4,6 trimethylbenzoyl diphenylphosphineoxide, a mixture of (2,6-dimethoxy benzoyl)-2,4,4 trimethylpentylphosphineoxide and 2-hydroxy-2-methyl-1-phenyl-propan-1-one, and mixtures of these.

Cationic cure-type photoinitiators include, for example: aromatic onium salts such as iodonium, sulfonium, arsonium, azonium, bromonium, or selenonium, which are preferably chemically modified to render them more hydrophobic, for example, by incorporating saturated hydrocarbon moieties such as alkyl or alkoxy substituents of from about 4 to about 18 carbon atoms. Particularly preferred cationic cure initiators include, for example, (4-octyloxyphenyl) phenyl iodonium hexafluoro antimonate; (4-octyloxyphenyl) diphenyl sulfonium hexafluoro antimonate; (4-decyloxyphenyl) phenyl iodonium hexafluoro antimonate; (4-octyloxyphenyl) phenyl iodonium hexafluoro phosphate; and (4-octadecyloxyphenyl) phenyl iodonium hexafluoro antimonate.

The examples of polymeric coating compositions set forth above are intended only to be illustrative of the coating compositions that may be employed in the present invention.

Other components that can be present in coating composition include stabilizers and adhesion promotors. As an antioxidant, one or more of the following compounds can be used, for example: thiobisphenols, alkylidene-bisphenols, alkyl phenols, hydroxybenzyl compounds, phosphites, phosphonites, and amines. General trade names include Irganox, Naugard, Ultranox and Santoflex. Some common ones that are used are Irganox 1035 and Irganox 245.

As an adhesion promoter, organofunctional alkoxysilanes can be used, for example, γ-mercaptopropyltrimethoxysilane, vinyltrimethoxyether silane, methacryloxy propyltrimethoxy silane, and the like.

Further components that can be present in the composition include, lubricants, and wetting agents.

To produce a coated substrate, a liquid coating composition can be applied to a substrate and subsequently cured. The cure can be conducted using ultraviolet or visible radiation. The coating can also be cured by electron beam irradiation without using a catalyst. More than one coating can be applied. For example, a first coating can be applied and cured followed by a second coating, and so on until the desired number of coatings have been applied. Alternatively, the layers can be applied on top of each other as liquids, a wet-on-wet process, with one final curing step at the end.

In many applications involving optical fibers, it is desirable to have an outermost layer (outer primary layer) that is tough or hard that can protect the optical fiber and underlying coatings. The coating compositions described herein can be used to provide underlying coatings, including the inner primary coating, which can be relatively soft in comparison to the outermost coating. The coating compositions described herein can also be used to provide an outermost layer (outer primary layer) that is tough or hard that can protect the optical fiber and underlying coatings. The coatings can be made sufficiently tough, for example, by reducing the molecular weight of the urethane oligomer, and/or increasing the amount of cross-link density by using polyfunctional diluents, such as, hexanediol diacrylate, tripropyleneglycol diacrylate, and trimethylolpropane triacrylate. The knowledge of adjusting the toughness of coating compositions to provide outer or inner primary coatings is well known by the skilled artisan.

The coatings provide sufficient adhesion to optical fibers but also are easily removed or stripped as a unit without leaving significant coating residue on the stripped glass fiber.

EXAMPLES

The following non-limiting examples and comparative examples are provided to further illustrate the invention.

Example I

Synthesis of a Urethane Oligomer

In a reaction vessel equipped with a stirrer and air purge, 146.2 g of α,α,α',α'-tetramethyl-meta-xylylenediisocyanate (TMXDI), 0.3 g of dibutyltin dilaurate (DBTDL) and 0.15 g of butylated hydroxytoluene (BHT) were added. Over a period 90 minutes 46.4 g of 2-hydroxyethyl-acrylate (HEA) was added. Care was taken that the reaction temperature did not exceed 40° C. The concentration of the isocyanate was determined using a colormetric titration using amine and HCL. Then 186.8 g of a polyether, PTG-L 1000 (Hodogaya Chemical Co. of Japan) was added after which 116.4 g of a polyolefin, EMPOL 1070, and 124.0 g of laurylacrylate was added to the reaction vessel and the reaction was conducted at 70° C. until the concentration isocyanate groups as determined by colormetric titration dropped to less than or equal to 1.

Examples II–V

Preparation and analysis of a coating composition

The oligomer prepared in example I was mixed with the components as shown in Table 1. CGI-1700 is a photoinitiator produced by Ciba Geigy. Irganox 245 is a stabilizer produced by Ciba-Geigy. Table 2 shows the properties of the liquid and cured coating compositions.

TABLE 1

| Composition (weight %) | Compositions | | | |
|---|---|---|---|---|
| | II | III | IV | V |
| oligomer of example I | 87 | 88 | 84 | 84 |
| lauryl acrylate | 4.5 | 8 | 6 | 12 |
| Phenoxyethyl acrylate | 4.5 | — | 6 | — |
| CGI-1700 (photoinitiator blend, Ciba) | 2.5 | 2.5 | 2.5 | 2.5 |
| Irganox 245 | 0.5 | 0.5 | 0.5 | 0.5 |
| γ-mercaptopropyltrimethoxysilane | 1 | 1 | 1 | 1 |

TABLE 2

| Properties of liquid coating | | | | |
|---|---|---|---|---|
| | II | III | IV | V |
| Properties of liquid coating | | | | |
| Viscosity (mPa.s) | 4600 | 4600 | 3600 | 3300 |
| Refractive index | 1.48 | 1.48 | 1.48 | 1.48 |
| Properties of cured coating | | | | |
| Tensile Strength (MPa) | 0.9 | 0.7 | 0.8 | 0.9 |
| Elongation (%) | 66 | 60 | 65 | 72 |
| Modulus (MPa) | 2.2 | 2.0 | 2.0 | 1.9 |
| E' = 1000 MPa (°C.) | −45 | −49 | −45 | −50 |
| E' = 100 MPa (°C.) | −25 | −29 | −25 | −29 |
| tan δ peak (°C.) | −16 | −19 | −17 | −20 |
| $E_0$ (MPa) | 1.8 | 1.7 | 1.9 | 1.9 |
| $H_2O$ Absorption % | 0.6 | 0.7 | | |
| $H_2O$ Extraction % | 0.6 | 0.7 | | |
| Hexane Absorption % | 28 | 31 | 27 | 31 |
| Hexane Extraction % | 7.1 | 7.5 | 6 | 6 |

Comparative Examples A–C

A radiation-curable composition was formulated from the following ingredients:

| INGREDIENT | A | B | C |
|---|---|---|---|
| urethane acrylate oligomer[1] | 70.0 | 70.0 | 70.0 |
| phenoxy ethyl acrylate | 8.0 | 10 | — |
| lauryl acrylate | 8.0 | 6.0 | 16 |
| CGI-1700 | 2.5 | 2.5 | 2.5 |
| Irganox 245 | 0.5 | 0.5 | 0.5 |
| mercapto propyl trimethoxy silane | 1.0 | 1.0 | 1.0 |
| tripropylene glycol diacrylate | 10.0 | 10.0 | 10.0 |
| Properties | | | |
| degree of clarity | hazy | hazy | slightly hazy |
| refractive index | 1.475 | 1.476 | 1.470 |
| viscosity (mPa.s) | 9,550 | 10,780 | 6,700 |
| tensile strength (MPa) | 0.9 | 0.8 | 1.0 |
| elongation (%) | 88 | 96 | 83 |
| secant modulus (MPa) | 1.3 | 1.1 | 1.2 |
| temp. (°C.) | −39 | −28 | −44 |
| E' = 1,000 MPa temp. (°C.) | −26 | −25 | −30 |
| E' = 100 MPa temp (°C.) | −24 | −22 | −26 |
| tan delta max $E_o$ (MPa) | 1.3 | 0.9 | 1.4 |

[1] A urethane acrylate oligomer was prepared from components given below wherein the oligomer can be represented as: H-TMXDI-Nisso2000-TMXDI-PTGL1000-TMXDI-Nisso2000-TMXDI-H wherein H represents hydroxyethylacrylate end-capping groups, Nisso2000 is a polybutadiene diol oligomer having molecular weight of about 2,000, and TMXDI and PTGL-1000 are as described above. The oligomer is reaction product of these components. The oligomer molecular weightwas controlled by the reaction conditions and component stoichiometry as disclosed below.

Oligomer Preparation for Comparative Examples A–C

The oligomer synthesis was carried out by the following procedure:

A flask was charged with TMXDI (161.14 g). Butylatedhydroxy toluene (0.3 g) and dibutyltin dilaurate (0.60 g) were added. Addition of hydroxyethyl acrylate (38.4 g) was carried out over 90 minutes. Temperature was held to less than 40° C. during this time. The temperature was then raised to 40° C. and held for 1 hour. The concentration of isocyanate was checked. Nisso2000 (797.28) and PTGL1000 (155.08 g) were added. Lauryl acrylate (289.0 g) was added. The temperature was raised to 80–85° C. and reaction occurred until the % NCO was less than 0.1 (about 5–6 hours). The mixture was very viscous and turbid.

These comparative compositions A–C were not acceptable for optical fiber coatings because of the haziness. Haziness is determined visually with the naked eye. In contrast, compositions of Table I had good clarity and were acceptable for optical fiber coatings.

Test Procedures

Water Extraction and Absorption

The water soak extraction and absorption were measured using the following procedure. A drawdown of each material to be tested was made at a film thickness of about 150 microns (6 mils) on a glass plate and cured. The cured film was cut to form three sample specimens, approximately 3 cm×3 cm (1½ inches×1½ inches), on the glass plate. The glass plate containing the three sample specimens was heated at 60° C. for one hour and then placed in a desiccator for 15 minutes.

125 ml (4 oz.) of deionized or distilled water was poured into three 125 ml (4 oz.) glass jars, maintained at a temperature of 23±2° C. Each of the sample specimens were removed from the glass plate and weighed on an analytical balance using corrugated Teflon paper to prevent sticking. Each sample specimen was then placed into one of the jars of water.

The sample specimens were soaked in the water for 30 minutes and then removed from the glass jars. The water remaining on the surface of the sample specimens was removed by blotting them with lint free wiping tissue.

The samples were reweighed as above and placed back into their respective jars.

The above procedure was repeated at 1, 2, 3, and 24 hours, and at 7 and 14 days.

At 21 days, the sample specimens were removed from the glass jars and reweighed as above. The sample specimens were placed onto a glass plate and heated at 60° C. for one hour, and then placed in a desiccator for 15 minutes. The sample specimens were reweighed as before.

The percent weight change at each time interval for each sample specimen was determined. The values for the three sample specimens at each time interval were averaged. The water absorption reported is the largest, positive average percent weight change.

The water extraction for each sample specimen was determined by dividing the difference of the initial and 21-day dried weights by the initial dried weight and multiplying by 100. The reported value is the average of the three sample specimen values.

The total water sensitivity is the sum of the absolute values of the water absorption and the water extraction.

Dynamic Mechanical Analysis

The elastic modulus (E'), the viscous modulus (E''), and the tan delta (E''/E') of the examples were measured using a Rheometrics Solids Analyzer (RSA-11), equipped with: 1) A personal computer having MS-DOS 5.0 operating system and having Rhios® software (Version 4.2.2 or later) loaded; 2) A liquid nitrogen controller system for low-temperature operation.

The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80° C. in a nitrogen atmosphere for 5 minutes. The temperature sweep used included cooling the test samples to about −60° C. or about −80° C. and increasing the temperature at about 1°/minute until the temperature reached about 60° C. to about 70° C. The test frequency used was 1.0 radian/second.

Adhesion

The adhesion of cured samples on a glass plate at 50% relative humidity and 95% relative humidity were tested using a universal testing instrument, Instron Model TTD. The load cell had a ten pound capacity.

Glass plates, polished, 20×20 cm, (Alletch Associates catalog number 26080) were used. The test material was applied to the glass plates and cured using a UV processor. The thickness of the cured film was about 75 microns.

The cured films were held at 50% relative humidity, at about 23° C., for seven days prior to testing. Prior to removing the plates from the environmental chamber, a layer of slurry (fine powdered polyethylene and water) was applied to the surface of the drawdown to retain the moisture.

Test specimens, approximately 1 inch in width and 5 inches long, were cut parallel to the direction in which the drawdown of the cured film was prepared. A thin layer of talc was applied to the first and third strips on each drawdown to reduce blocking during the adhesion test.

The instrument was calibrated prior to testing. The crosshead speed was set to 10.00 inch/min. For each material, the force required to remove four test specimens from the glass plate was measured and recorded on a strip chart recorder. The value reported is the average of the four measured values. The test specimens remaining on the glass plate were then held at 95% relative humidity, at about 23° C., in an environmental chamber for 1 more day. Prior to removing the plates from the environmental chamber, a layer of slurry (fine powdered polyethylene and water) was applied to the surface of the drawdown to retain the moisture. For each material, the force to remove four test specimens from the glass plate was measured as above.

Tensile Testing

The tensile strength of cured samples was tested using a universal testing instrument, Instron Model 4201 equipped with a personal computer and software "Series IX Materials Testing System." The load cells used were 2 and 20 pound capacity. The ASTM D638M was generally followed, with the following modifications.

A drawdown of each material to be tested was made on a glass plate and cured using a UV processor. The cured film was conditioned at 23±2° C. and 50±5% relative humidity for a minimum of sixteen hours prior to testing.

A minimum of eight test specimens, having a width of 0.5±0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviates from the average by more than 10% relative, the test specimen was discarded. All specimens came from the same plate.

The appropriate load cell was determined by using the following equation:

$$[A \times 145] \times 0.0015 = C$$

Where: A=Product's maximum expected tensile strength (MPa); 145=Conversion Factor from MPa to psi; 0.00015= approximate cross-sectional area (in$_2$) of test specimens; and C=lbs. The 2 pound load cell was used for materials where C=1.8 lbs. The 20 pound load cell was used for materials where 1.8 (C<18 lbs). If C>19, a higher capacity load cell was required.

The crosshead speed was set to 1.00 inch/min, and the crosshead action was set to "return at break". The crosshead was adjusted to 2.00 inches jaw separation. The air pressure for the pneumatic grips was turned on and adjusted as follows: set approximately 20 psi(1.5 Kg/cm$^2$) for primary optical fiber coatings and other very soft coatings; set approximately 40 psi(3 Kg/cm$^2$) for optical fiber single coats; and set approximately 60 psi (4.5 Kg/cm$^2$) for secondary optical fiber coatings and other hard coatings. The appropriate Instron computer method was loaded for the coating to be analyzed.

After the Instron test instrument had been allowed to warm-up for fifteen minutes, it was calibrated and balanced following the manufacturer's operating procedures.

The temperature near the Instron Instrument was measured and the humidity was measured at the location of the humidity gage. This was done just before beginning measurement of the first test specimen.

Specimens were only analyzed if the temperature was within the range 23±1.0° C. and the relative humidity was within 50±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested.

The calculation of tensile properties was performed automatically by the software package.

The values for tensile strength, % elongation, and (secant or segment) modulus were checked to determine whether any one of them deviated from the average enough to be an "outlier." If the modulus value was an outlier, it was discarded. If there were less than six data values for the tensile strength, then the entire data set was discarded and repeated using a new plate.

Hexane Absorption and Extraction

The hexane absorption was measured in the same manner as the water absorption above, except that hexane was substituted for water and the samples were soaked in the hexane only for 1 day. The hexane extractables was measured in the same as the water extractables except that hexane was substituted for water and the time intervals for measuring the weight of the sample were 15 minutes, 30 minutes, 1 hour, 2 hours, 6 hours, and 24 hours. The weight change in percent of the samples were measured over each time interval. The hexane extractables reported was the highest weight change in percent.

While this invention has been explained in detail and with reference to specific embodiments thereof, it will be apparent to one of ordinary skill in the art that various changes and modifications can be made therein without departing from the spirit and scope thereof.

What is claimed is:

1. A radiation-curable coating composition for an inner primary optical fiber coating comprising:

(A) about 30 to about 90% by weight of at least one urethane block copolymer oligomer comprising at least three moieties:
  (i) a backbone comprising at least one aliphatic polyether block and at least one aliphatic polyolefin block,
  (ii) an aromatic group having at least one alkyl substituent, and
  (iii) reactive termini,
  wherein said moieties are connected via urethane linkages and/or urea linkages, and
  wherein said aromatic group is connected to said urethane linkages and/or urea linkages through said at least one alkyl substituent; and
  wherein the number average molecular weight of said aliphatic polyolefin block is about 1,800 g/mol or less, (B) about 5 to about 65% by weight of one or more reactive diluents, each diluent being terminated with at least one end group capable of reacting with the reactive terminus of (A);

(C) 0 to about 10% by weight of a photoinitiator;

(D) 0 to about 5% by weight of an antioxidant; and (E) 0 to about 30% by weight of an adhesion promoter.

2. The coating composition according to claim 1, wherein the urethane oligomer (A) is a reaction product of:

(i) at least two oligomers, each oligomer having at least two groups selected from the group consisting of hydroxyl and amine groups, and wherein at least one oligomer is an aliphatic polyether and at least one oligomer is an aliphatic polyolefin, (ii) an aromatic polyisocyanate, wherein the isocyanate groups are not directly linked to the aromatic group, and (iii) a hydroxy functional ethylenically unsaturated monomer.

3. A radiation-curable coating composition comprising:
(A) about 30 to about 90% by weight of a urethane oligomer having reactive termini;
(B) about 5 to about 65% by weight of one or more reactive diluents, each diluent being terminated with at least one end group capable of reacting with the reactive termini of (A);
(C) 0 to about 10% by weight of a photoinitiator;
(D) 0 to about 5% by weight of an antioxidant; and
(E) 0 to about 30% by weight of an adhesion promoter, wherein the urethane oligomer (A) has the general formula (1)

$$R^3-[L-R^2-NH-CO-O-R^1]_Y \quad (1)$$

wherein:
$R^1$ is a reactive terminus;
$R^2$ is an aromatic group having one or more alkyl substituents, wherein the urethane group, O—CO—NH—, and L are attached to the one or more alkyl substituents;
$R^3$ is an oligomer comprising a block copolymer having a polyether block and an aliphatic polyolefin block, wherein the molecular weight of said polyolefin block is less than about 1,800 g/mol;
L is a urea linkage, a urethane linkage, or mixtures thereof; and
Y is 2 or greater.

4. A coating composition according to claim 1, wherein the reactive termini comprise acrylate groups and the urethane oligomer has a molecular weight of less than about 5,000.

5. A coating composition according to claim 1, wherein the reactive termini comprise acrylate groups and the urethane oligomer has a molecular weight of less than about 2,500.

6. A coating composition according to claim 3, wherein the reactive termini comprise acrylate groups and the urethane oligomer has a molecular weight less than about 5000.

7. A coating composition according to claim 2, wherein the aromatic polyisocyanate is represented by the formula (2):

$$O=C=N-R^4-Ar-R^5-N=C=O \quad (2)$$

wherein $R^4$ and $R^5$ are saturated hydrocarbon groups, and Ar is an aromatic ring.

8. A coating composition according to claim 7, wherein the aromatic polyisocyanate is a xylene-derivative.

9. A coating composition according to claim 7, wherein the aromatic polyisocyanate is α,α,α',α'-tetramethyl-meta-xylylenediisocyanate.

10. A coating composition according to claim 1, wherein (B) comprises a compound having an aromatic group and a group capable of reacting with the reactive termini of (A) in an amount of less than 10% by weight of the coating composition.

11. A coating composition according to claim 1, comprising about 0.1 to about 10% by weight of said photoinitiator and about 0.1 to about 30% by weight of said adhesion promoter.

12. An optical fiber coated with at least one coating composition according to claim 1, wherein said composition has been radiation-cured.

13. An optical fiber coated with at least one coating composition according to claim 3, wherein said composition has been radiation cured.

14. A coating composition according to claim 2, wherein said oligomer (A) has a molecular weight of 400 to 5,000.

15. A coating composition according to claim 2, wherein said oligomer (A) has a molecular weight of about 500 to about 2,500.

16. A method of making a coating composition comprising the combination of steps of:
reacting the following components whereby an oligomer having reactive termini is formed:
(i) at least one polyolefin oligomer having at least two groups selected from the group consisting of hydroxyl groups and amine groups, wherein the polyolefin oligomer has a molecular weight of less than about 1,800 g/mol, and at least one polyether oligomer having at least two groups selected from the group consisting of hydroxyl groups and amine groups,
(ii) an aromatic polyisocyanate, wherein the isocyanate groups are not directly linked to the aromatic group, and
(iii) a hydroxy functional ethylenically unsaturated monomer,
combining the urethane oligomer with one or more reactive diluents, each diluent being terminated with at least one end group capable of reacting with the reactive termini, and optionally an adhesion promoter,
wherein the urethane oligomer is present in an amount of about 30 to about 90% by weight, the reactive diluent is present in an amount of about 5 to about 65% by weight, and the adhesion promoter is optionally present in an amount of 0 to about 30% by weight.

17. A method of making a coated optical fiber comprising the combination of steps of applying a coating composition according to claim 1 to an optical fiber and curing said coating composition.

18. A method of making a coated optical fiber comprising the combination of steps of applying a coating composition according to claim 3 to an optical fiber and curing said coating composition.

19. A coating composition according to claim 3, wherein Y is 2 to about 5.

20. A coating composition according to claim 3, wherein Y is 2.

21. A coating composition according to claim 1, wherein the three types of moieties are connected via urethane linkages and the aromatic group is connected to urethane linkages via the one or more alkyl substituents.

22. A coating composition according to claim 3, wherein L is a urethane linkage.

23. A radiation-curable coating composition adapted for use as an inner primary coating on glass optical fibers, which when coated and cured on glass optical fibers in combination provides:
(1) a refractive index of a magnitude adequate to refract errant light signals away from said glass optical fiber;
(2) enhanced resistance to hexane and water;
(3) a sufficient toughness and modulus at low temperatures to be used as an inner primary coating;
(4) adherence to glass optical fibers while being strippable, and (5) good transparency, said coating composition comprising:
(A) a urethane oligomer comprising three moieties:
(a) a backbone comprising a block copolymer of an aliphatic polyether and an aliphatic polyolefin, wherein the molecular weight of said polyolefin block is less than about 1,800 g/mol,
(b) an aromatic group having at least one alkyl substituent, and (c) reactive termini, said moieties being connected via urethane linkages and/or urea linkages, the aromatic group being connected to said urethane linkages and/or urea linkages through said at least one alkyl substituent; and (B) one or more reactive diluents, each diluent being terminated with at least one end group capable of reacting with said reactive termini.

24. The coating composition according to claim 1, wherein the reactive termini contain ethylenic unsaturation.

25. A radiation-curable coating composition for an inner primary coating formulated from:

(A) about 30% to about 90% by weight of a urethane or urea oligomer comprising three moieties,
  (i) a backbone containing at least one polyether block and at least one polyolefin block, wherein the molecular weight of said polyolefin block is less than about 1,800 g/mol,
  (ii) an aromatic group having at least one alkyl substituent, and
  (iii) a reactive terminus containing an acrylate or methacrylate functional group,
  said moieties being connected via urethane linkages and/or urea linkages, the aromatic group being connected to said urethane linkages and/or urea linkages through said at least one alkyl substituent;

(B) about 5% to about 65% by weight of one or more reactive diluents, each diluent being terminated with at least one end group capable of reacting with the reactive terminus of (A);

(C) 0% to about 10% by weight of a photoinitiator;

(D) 0% to about 5% by weight of an antioxidant; and (E) 0% to about 30% by weight of an adhesion promoter.

26. The radiation-curable coating composition according to claim 25, wherein the urethane oligomer (A) comprises the reaction product of:

(i) at least one oligomer having at least two groups selected from the group consisting of hydroxyl groups and amine groups, and an aliphatic polyether backbone, at least one oligomer having an aliphatic polyolefin backbone and a molecular weight of less than about 1,800 g/mol, (ii) an aromatic polyisocyanate, wherein the isocyanate groups are linked to the aromatic group via at least one alkyl group, and (iii) a hydroxy functional ethylenically unsaturated monomer or an amine functional ethylenically unsaturated monomer.

27. A radiation-curable coating composition adapted for use as an inner primary coating on glass optical fibers, which when coated and suitably cured on glass optical fibers provides in combination:

(1) a refractive index of a magnitude adequate to refract errant light signals away from said glass optical fiber;
(2) enhanced resistance to hexane and water;
(3) a sufficient toughness and modulus at low temperatures to be used as an inner primary coating;
(4) adherence to glass optical fibers while being strippable therefrom,
(5) resistance to yellowing, and
(6) good transparency, said radiation-curable coating composition consisting essentially of:
  (A) a urethane or urea oligomer comprising three moieties,
    (a) a backbone comprising an aliphatic polyether block, and an aliphatic polyolefin block, wherein the molecular weight of the polyolefin block is less than about 1,800 g/mol,
    (b) an aromatic group having at least one alkyl substituent, and
    (c) a reactive terminus containing ethylenic unsaturation which is curable by free-radical mechanism,
    wherein said moieties being connected via urethane linkages and/or urea linkages, and the aromatic group being connected to said urethane linkages and/or urea linkages through said at least one alkyl substituent; and
  (B) one or more reactive diluents, each diluent being terminated with at least one end group capable of reacting with said reactive termini.

28. The radiation-curable coating composition according to claim 27, wherein said reactive terminus contains an acrylate or methacrylate group.

29. The radiation-curable coating composition according to claim 27, wherein said coating composition when suitably cured provides the combination of properties of:

a hexane absorption of less than about 40 wt. %;

a hexane extraction of less than about 8 wt. %;

a water absorption of less than about 1 wt. %;

a water extraction of less than about 1 wt. %; and a refractive index of at least about 1.48, and excellent transparency when viewed with the naked eye.

30. A radiation-curable coating composition adapted for use as a primary coating on glass optical fibers, which when coated and suitably cured on glass optical fibers, provides the combination of properties of:

(1) a refractive index of a magnitude adequate to refract errant light signals away from said glass optical fiber;
(2) enhanced resistance to hexane and water;
(3) a sufficient toughness and modulus at low temperatures to be used as an inner primary coating;
(4) adherence to glass optical fibers while being strippable therefrom,
(5) resistance to yellowing, and
(6) good transparency, said uncured coating composition consisting essentially of a urethane or urea oligomer consisting essentially of:
  (a) a backbone oligomer comprising an aliphatic polyether block and an aliphatic polyolefin block, wherein said polyolefin block has molecular weight of less than about 1,800 g/mol, and
  said backbone oligomer being linked to at least one urethane or urea group which is bonded to a substituted or unsubstituted aromatic ring through a straight or branched chain divalent methylenic grouping having from 1 to 6 carbon atoms, said aromatic ring being further bonded through a second straight or branched chain divalent methylenic grouping having from 1 to 6 carbon atoms to a second urethane or urea group, said second urethane or urea group further carrying a reactive terminus having ethylenic unsaturation which is curable by free-radical mechanism, and
  (b) one or more reactive diluents, each said diluent being terminated with at least one end group capable of reacting with said reactive termini.

* * * * *